United States Patent
Isurin et al.

(10) Patent No.: US 6,483,731 B1
(45) Date of Patent: Nov. 19, 2002

(54) ALEXANDER TOPOLOGY RESONANCE ENERGY CONVERSION AND INVERSION CIRCUIT UTILIZING A SERIES CAPACITANCE MULTI-VOLTAGE RESONANCE SECTION

(75) Inventors: Alexander Isurin, Columbus, OH (US); Alexander Cook, Dublin, OH (US)

(73) Assignee: Vanner, Inc., Columbus, OH (US)

( * ) Notice: Subject to any disclaimer, the term of this patent is extended or adjusted under 35 U.S.C. 154(b) by 0 days.

(21) Appl. No.: 09/628,741

(22) Filed: Jul. 31, 2000

(51) Int. Cl.⁷ .............................................. H02M 7/00
(52) U.S. Cl. .................................... 363/125; 363/61
(58) Field of Search ................... 363/125, 126, 363/127, 128, 61

(56) References Cited

U.S. PATENT DOCUMENTS

| | | | | |
|---|---|---|---|---|
| 4,616,300 A | * | 10/1986 | Santelmann, Jr. ............. | 363/21 |
| 4,893,227 A | * | 1/1990 | Gallios et al. ................ | 363/26 |
| 4,899,271 A | * | 2/1990 | Seiersen ..................... | 363/126 |
| 5,499,178 A | * | 3/1996 | Mohan ........................ | 363/39 |
| 5,546,300 A | * | 8/1996 | Lee et al. .................... | 363/132 |
| 5,715,155 A | * | 2/1998 | Shahani et al. ............. | 363/132 |
| 6,018,221 A | * | 1/2000 | Ohtake ........................ | 315/307 |
| 6,212,083 B1 | * | 4/2001 | Sakakibara .................. | 363/126 |

* cited by examiner

Primary Examiner—Adolf Deneke Berhane
(74) Attorney, Agent, or Firm—James R. Eley, Esq.; Thompson Hine LLP

(57) ABSTRACT

A circuit comprising a primary section and a multiple voltage secondary section. The multiple voltage secondary section includes a multiple voltage resonance section, a filter section, and a load coupling section. The circuit also includes a transformer, which is operatively configured to couple the primary and secondary sections. The multiple voltage resonance section includes a capacitance, i.e., an Alexander Topology. This capacitance, which is preferable based on series capacitors, operatively generates a predetermined voltage, such that a turns ratio of the transformer is lower than a non-multiple voltage resonance section to generate the predetermined voltage. Hence, this configuration decreases energy loss from the transformer, thereby increasing efficiency.

20 Claims, 14 Drawing Sheets

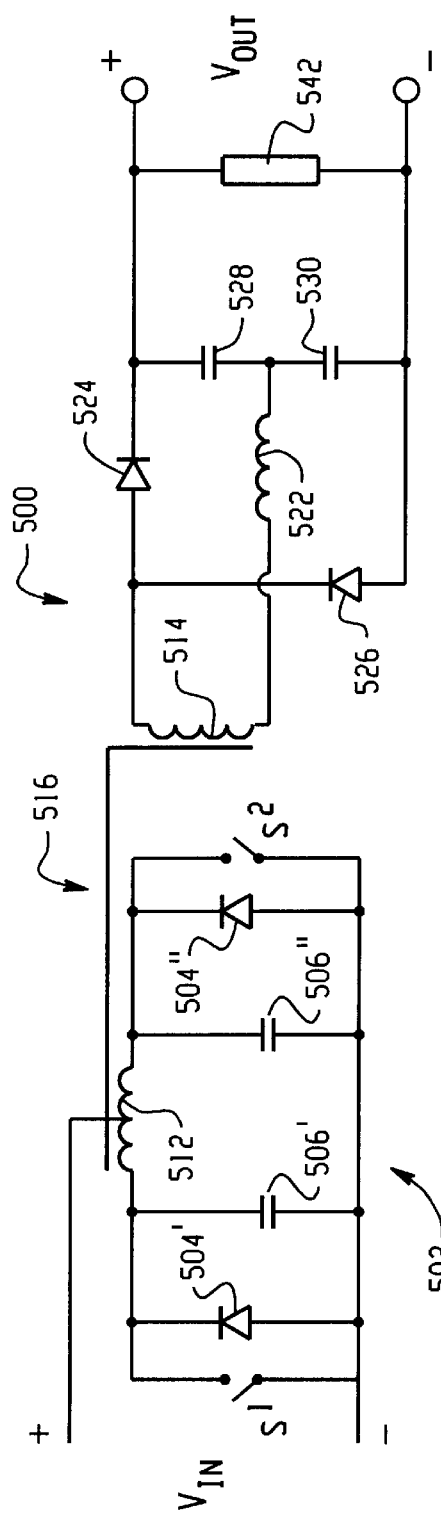
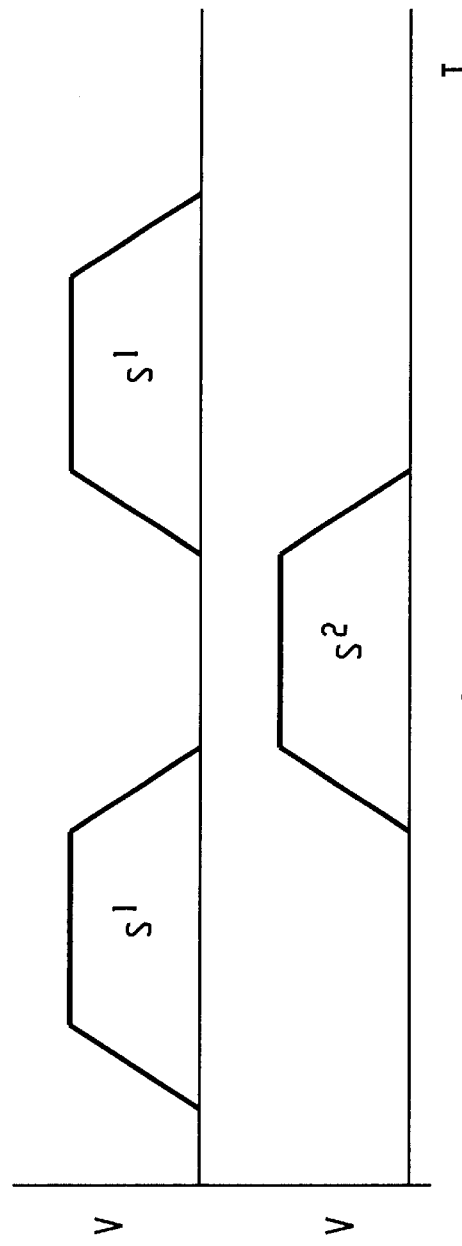
Fig. 6A
$S^1 = S^2 = ZVS = ZCS$
Fig. 6B

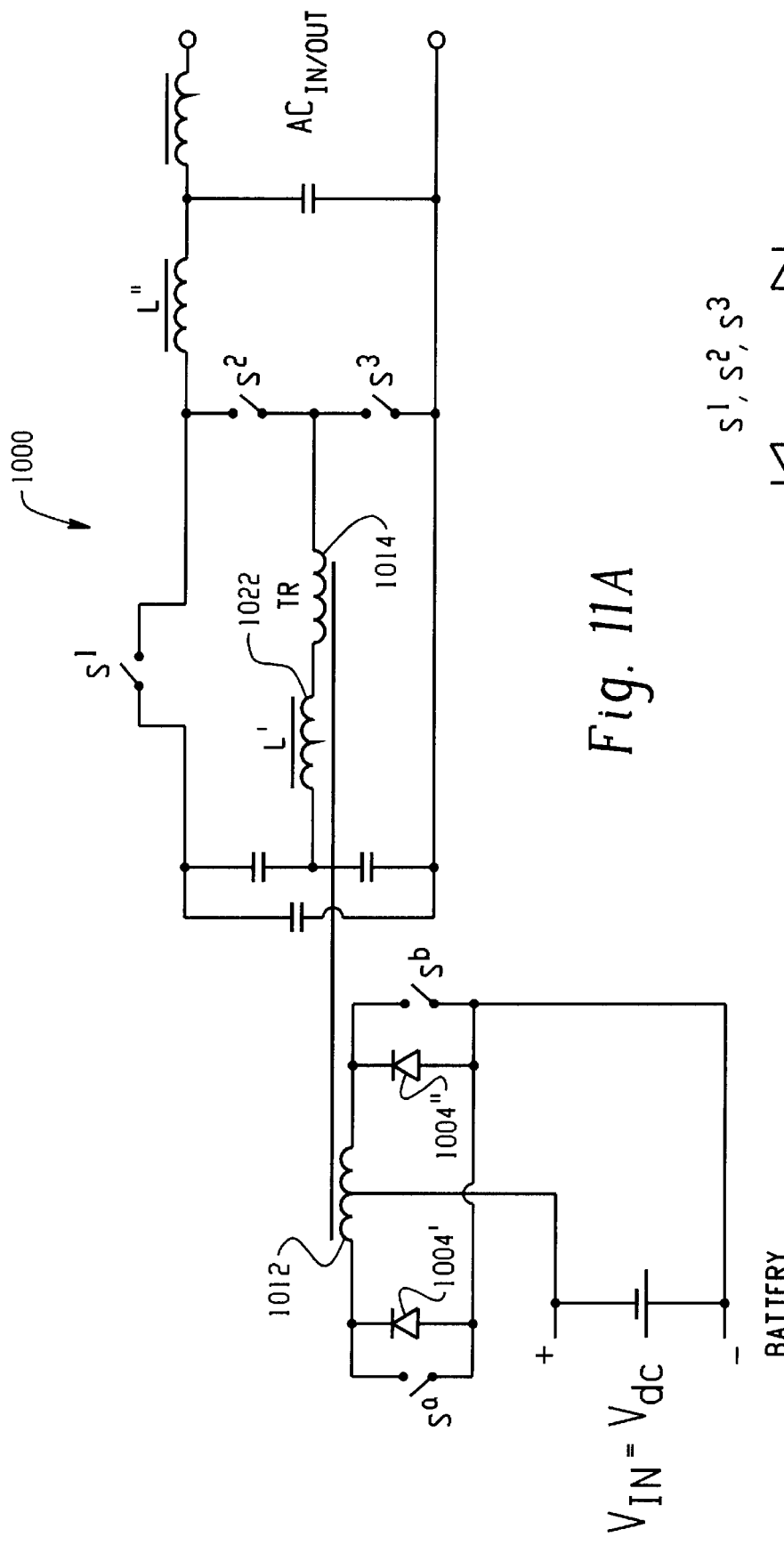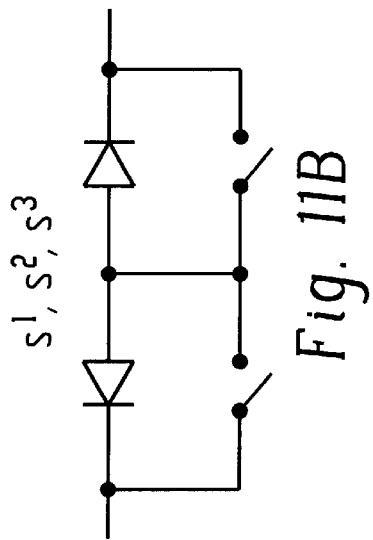
Fig. 11A
Fig. 11B

ALEXANDER TOPOLOGY RESONANCE ENERGY CONVERSION AND INVERSION CIRCUIT UTILIZING A SERIES CAPACITANCE MULTI-VOLTAGE RESONANCE SECTION

BACKGROUND OF THE INVENTION

The present invention is directed to resonant energy conversion and/or inversion circuits. More particularly, DC-to-DC or AC/DC-to-DC/AC step-up voltage circuits with high efficiency.

DC-DC converters are widely used in step-up ac motor drives, regulated switch-mode DC power supplies, inverters, and DC-motor drives. Often the input to these DC-DC converters is an unregulated DC voltage, which is obtained by rectifying a line voltage. Thus, the DC input voltage normally fluctuates due to changes in the line-voltage magnitude. Switch mode DC-to-DC converters are used to convert the unregulated DC input voltage into a controlled DC output voltage at a desired voltage level. The converters are often used in an electrical isolation transformer in switch mode DC power supplies, and almost always without an isolation transformer in the case of DC-motor drives.

In DC-DC converters an average DC output voltage must be controlled for it to equal a desired level, though an input voltage and an output load impedance may fluctuate. Switch mode DC-DC converters utilize one or more switches to transform DC voltage from one voltage level to another. The average output voltage in a DC-DC converter with a given input voltage is controlled by controlling an on/off duration of a switch, where this average value of output voltage depends on the on-duration and off-duration of the switching signal.

One topology for controlling the average output voltage utilizes switching at a constant frequency and adjusting an on-duration of the switch. When using this topology, called Pulse Width Modulation (PWM) switching, a switch duty ratio D (defined as a ratio of constant switching frequency, the switch control signal, which controls the state (on or off) of the switch, is generated in one of two ways: 1) deriving the PWM signal directly through a known calculation in a microprocessor or 2) by comparing a signal level control voltage with a repetitive waveform. The control voltage signal is generally obtained by amplifying an error value, which is the difference between an actual output voltage and its desired value. The frequency of the repetitive waveform with a constant peak, e.g., a sawtooth or square wave, establishes the switching frequency. This frequency is kept constant in PWM control and is chosen to be in a few kilohertz to a few hundred kilohertz range. When the amplified error signal, which varies very slowly with time relative to the switching signal, is greater than the waveform being used the switch control signal becomes high, causing the switch to turn on. Otherwise, the switch is off.

Step-up converters are used in regulated DC power supplies and regenerative braking of DC motors, where the output voltage is always greater than the input voltage. When a switch is in an ON position, a diode in an input stage is reversed biased, thus isolating an output stage. The input stage is used to supply energy to an inductor. When the switch is in an OFF position, the output stage receives energy from the inductor as well as from the input stage. In steady state, an output filter capacitance theoretically becomes very large, which ensures a constant output voltage. The step-up converter transfers energy in only one direction, which is a direct consequence of it being able to produce only unidirectional voltage and current.

A push-pull inverter requires a transformer with a center-tapped primary. This type of inverter can operate in a PWM or a square-wave mode. The main advantage of the push-pull inverter is that no more than one switch in series conducts at any instant of time. This is important if the DC input to the inverter is from a low-voltage source, such as a battery, where the voltage drop across more than one switch in series would result in a significant reduction in energy efficiency. Feedback diodes connected anti-parallel to the switches are required to carry the reactive current, where their conduction interval depends inversely on the power factor of an output load. These feedback diodes are needed to provide a path for the high current required due to leakage flux of the transformer. In this configuration, there is a slight difference in the switching times of two switches. Thus, there is always an imbalance between the peak values of the two switch currents. This can be controlled through current-mode control of the inverter.

Generally, in a converter with electrical isolation there is a primary and secondary side coupled by a transformer. In one conventional configuration, shown in FIG. 1, the secondary side has a full bridge parallel-loaded resonant (PLR) section, which includes diodes 24, 26, 32, and 34 and a filter section. In operation, assuming the transformer is ideal, when a switch is switched to an ON position on the primary side, diodes 24 and 32 are forward biased and diodes 26 and 32 reverse biased. Then, when the switch is in a switched to an OFF position, the inductor current circulates through diodes 32 and 34, which causes the inductor current to decrease linearly.

Traditionally, there are three configurations of resonant-switch converters, which are alternative devices used in place of the switch-mode controllable switches. First, there is a zero-current switching (ZCS) topology where the switch turns on and off at zero current. The peak resonant current flows through the switch, but the peak switch voltage remains the same as in the switch-mode counterpart. Second, there is a zero-voltage-switching (ZVS) topology where the switch turns on and off at zero voltage. The peak resonant voltage appears across the switch, but the peak switch current remains the same as in the switch-mode counterpart. Third, there is a zero-voltage-switching, clamped-voltage (ZVS-CV) topology where the switch turns on and off at zero voltage. However, a converter of this topology consists of at least one converter leg made up of two such switches. In this third topology, the peak switch voltage remains the same as in its switch-mode counterpart, but the peak switch current is generally higher.

Usually, to soft switch a switch-mode converter, a commutation circuit is needed to turn off the switching device. These commutation circuits circulate a current through a conducting switching device in a reverse direction, and thus force a total switching device current to go to zero, which turns the switch off. These circuits often consist of some form of an L-C resonant circuit driven by a frequency of commutation.

Unfortunately, the efficiency of these above-mentioned conventional circuits is rather low, e.g., 80%. Also, it is usually quite complex a design, e.g., parallel connection of low-power converter, if one wants to increase the efficiency in order to achieve Vout/Vin$\geq$10 with Power$\geq$2 kW. Therefore, what is needed is a resonance conversion circuit that has a simple circuit topology with high efficiency, which can achieve the above input/output voltage ratio and power parameters desired.

SUMMARY OF THE INVENTION

This present invention overcomes all these above-mentioned shortcomings of the prior art devices through use of a resonance section in a DC-DC converter circuit that is operatively configured to produce multiple voltage, i.e., the Alexander topology circuit.

The present invention includes a circuit comprising a primary section and a multiple voltage secondary section. The multiple voltage secondary section includes a multiple voltage resonance section, a filter section, and a load coupling section. The circuit also includes a transformer, which is operatively configured to couple the primary and secondary sections. The multiple voltage resonance section includes an equivalent capacitance, i.e., the Alexander topology circuit. This equivalent capacitance, which is preferably two series capacitors, operatively generates a predetermined voltage, such that a turns ratio of the transformer is lower than a non-multiple voltage resonance section to generate the predetermined voltage. Hence, this configuration decreases energy loss from the transformer, thereby increasing efficiency.

An advantage of the present invention is that by using this topology a circuit with a simple configuration operates at a high efficiency, i.e., above 90%.

Another advantage of the present invention is that through the use of multi-voltage energy conversion, a turns ratio of a transformer is half as big compared to conventional topologies, while the input and output energy parameters remain the same. Hence, this topology produces higher efficiency.

A still further advantage of the present invention is that since the voltage on reactive components is lower than in the conventional typologies, the size of these components can be reduced. Thus, the overall circuit is smaller and costs less.

Another still further advantage of the present invention is that by decreasing the variable at the input of the output filter, this topology allows the reduction of reference power of the output filter. In alternative embodiments an output filter can be dispensed with altogether.

BRIEF DESCRIPTION OF THE DRAWINGS

Further features of the present invention will become apparent to those skilled in the art to which the present invention relates from reading the following specification with reference to the accompanying drawings, in which:

FIG. 6A is a schematic of a resonance energy conversion circuit according to a fifth embodiment of the present invention FIG. 6B is a graph of the voltage across the switches in FIG. 6A during different modes over a predetermined time period;

FIG. 11A is a schematic of a resonance energy inversion circuit according to an tenth embodiment of the present invention;

FIG. 11B is a schematic of the switches in FIG. 11A;

DETAILED DESCRIPTION OF THE PREFERRED EMBODIMENTS

Figure 1:
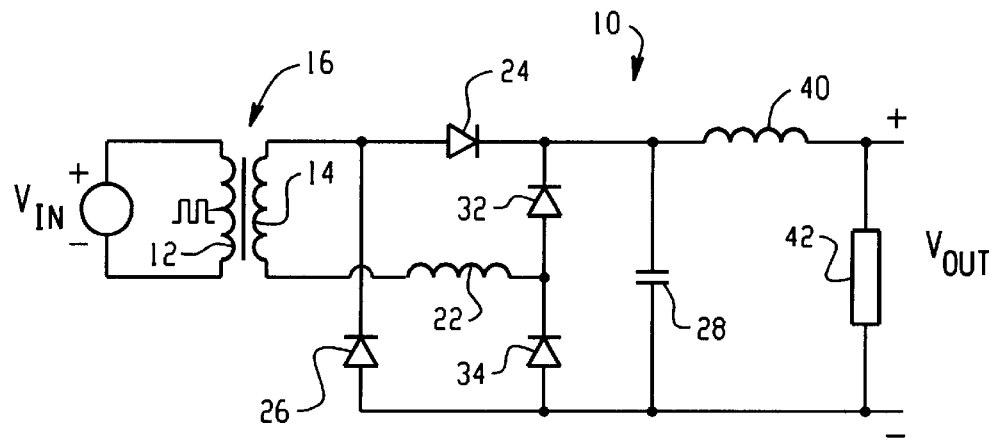
FIG. 1 is a schematic of a conventional resonance energy conversion circuit.

With reference again to FIG. 1, there is shown a prior art resonance energy conversion circuit 10 that exhibits the problems as previously described. This circuit 10 has a primary side with a power source Vdc=Vin. The primary side further includes a primary side inductor 12 that is coupled to a secondary side inductor 14, where inductors 12 and 14 form a transformer 16. The secondary side further includes a resonance section with an inductor 22, a first resonance diode 24, and a second resonance diode 26. This resonance section further includes a capacitor 28 and rectifier diodes 32 and 34. Connected to the resonance section is a filter and load section that has an inductor 40 and a resistive element 42. In circuit 10, the resistive element 42 is integral with the load section, across which is Vout.

In this configuration, the circuit 10 operates as a uni-directional inverter. This means that energy theoretically moves in only one direction in the circuit 10, which is towards the load section 42, after the energy has passed through the resonance section. As an example, when the transformer 16 has a turns ratio, N, of 1:10, an input voltage of 10 V produces an output voltage of 100 V, thus Vout/

Vin=10. Also, the power P (determined by P=IV) is 1 kW (100 V*10 A) if the load resistance 42 is 10 Ohms with the above output voltage of 100 V. Unfortunately, this circuit has a low efficiency, normally a maximum of about 80%. This low efficiency results from the required large turns ratio, N, in the transformer 16 needed to produce the large output voltage, where such a large turns ratio results in a lot a leakage. Accordingly, there is a loss in the amount of power that can be generated from a specific input voltage because of this large leakage. Hence, the low efficiency of the circuit 10.

With continuing reference to FIG. 1, the circuit 10 is driven by a zero-current switching (ZCS) topology, where the switch (not shown) that turns on and off at zero current, where the switching signal is shown through the figures as a square wave. This switch has an operating frequency, or frequency of commutation, which is variable.

Throughout the remaining Figures, when referring to similar elements (except switches) as are found in the prior art circuit 10, similar element numbers will be used, i.e., x12 (where x is the current circuit element number) is a device corresponding to similar element 12 in circuit 10. Further, unless otherwise specified, all circuits have ZCS typologies with a variable frequency of commutation.

Figure 2:
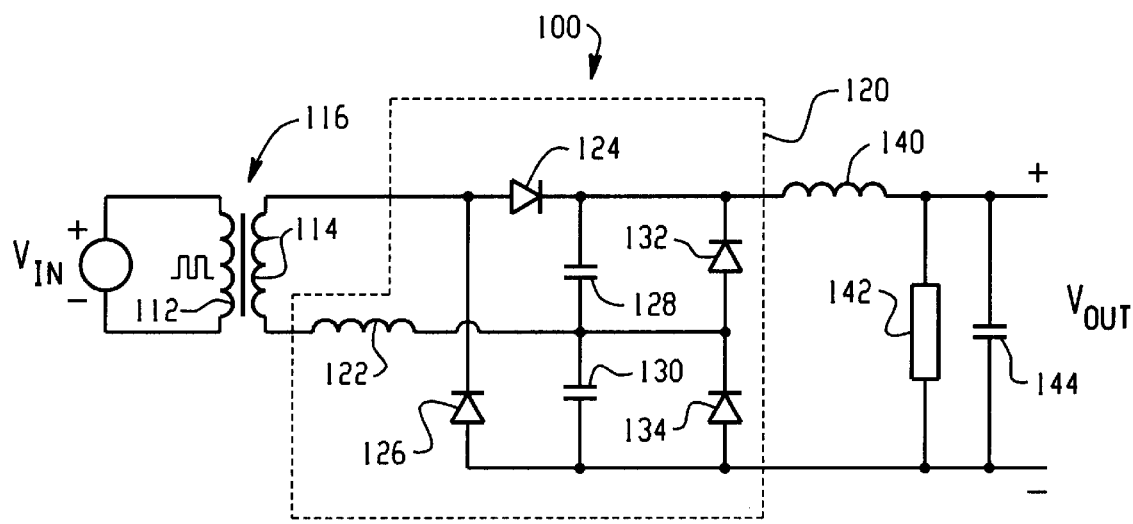
FIG. 2 is a schematic of a resonance energy conversion circuit according to a first embodiment of the present invention.

Turning now to FIG. 2, a converter circuit 100 according to a first embodiment of the present invention is shown. It is to be appreciated that this circuit 100, and all the circuits that follow, can have various primary side circuit configurations as is known in the art. A transformer 116, which is used to couple the primary and secondary sides, is comprised of inductors 112 and 114. On the secondary side there is a resonance section 120 with an inductor 122, resonance diodes 124 and 126, and a multi-voltage section that includes capacitors 128 and 130. This multi-voltage section arrangement defines the Alexander topology (Alex circuit) arrangement for converter and inverter circuits. The resonance section 120 further includes blocking diodes 132 and 134. A filter/load section of the circuit 100 includes an inductor 140, a resistive device 142, and a capacitor 144. An output voltage Vout is produced across the resistive device 142, which is preferably a resistor.

In operation, through use of the multi-voltage section, capacitors 128 and 130, the turns ratio, N, of transformer 116 is reduced to at least half (1:5) of what was needed in the prior art circuit 10 (1:10) to generate the same output voltage for the same input voltage. This is accomplished by a multiplication effect of the series capacitors 128 and 130. Hence, twice the voltage is produced in the resonance section 120 and passed to the load section. This produces an output voltage in the present invention that is twice the prior art value when using the same input voltage and load impedance. Thus, to get the same output voltage of 100 V, there need only be a turns ratio of 1:5 in the transformer 116. This, reduction of turns required in the transformer 116 reduces the leakage inductance. Also, the size of reactive impedances throughout the circuit 100 are reduced. By reducing the leakage inductance, the same voltage and power parameters of the prior art circuit 10 are met at a higher efficiency within the circuit 100 of the present invention. In this preferred configuration, the circuit 100 of the present invention has an efficiency of 90% or more with Vout/Vin=10 and a power of P=1 kW.

Figure 3:
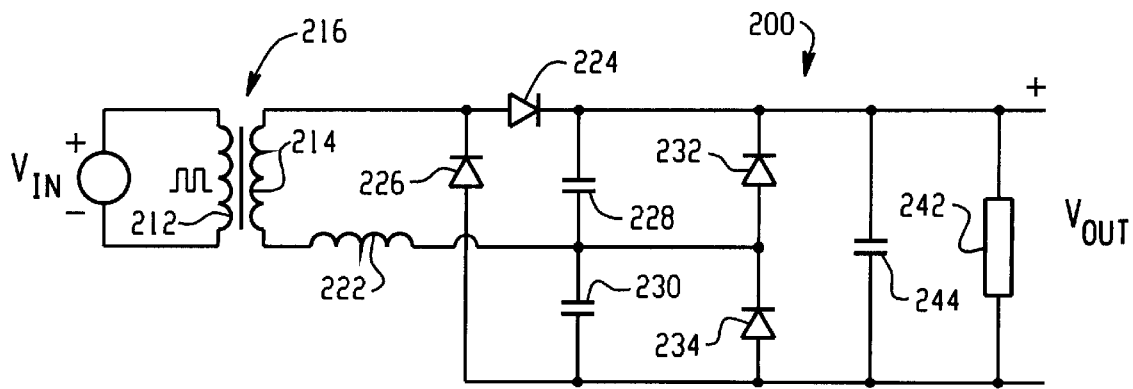
FIG. 3 is a schematic of a resonance energy conversion circuit according to a second embodiment of the present invention.

With reference to FIG. 3, a converter circuit 200 according to a second embodiment of the present invention is shown. This circuit 200 is configured to operate similar to the prior art circuit 10, but includes the multi-voltage section, capacitors 228 and 230, which are also found in circuit 100 at 128 and 130. Thus, circuit 200 has a lower turns ratio than the prior art, while still having the same output voltage and input voltage parameters as the prior art. An alteration between this circuit 200 and circuit 100 is that this circuit utilizes a filter capacitor 244 instead of the filter inductor 140. It is to be appreciated that there are alternatively various other output filter topologies that can be used in addition to the preferred Alexander topologies shown in FIGS. 2 and 3.

Figure 4:
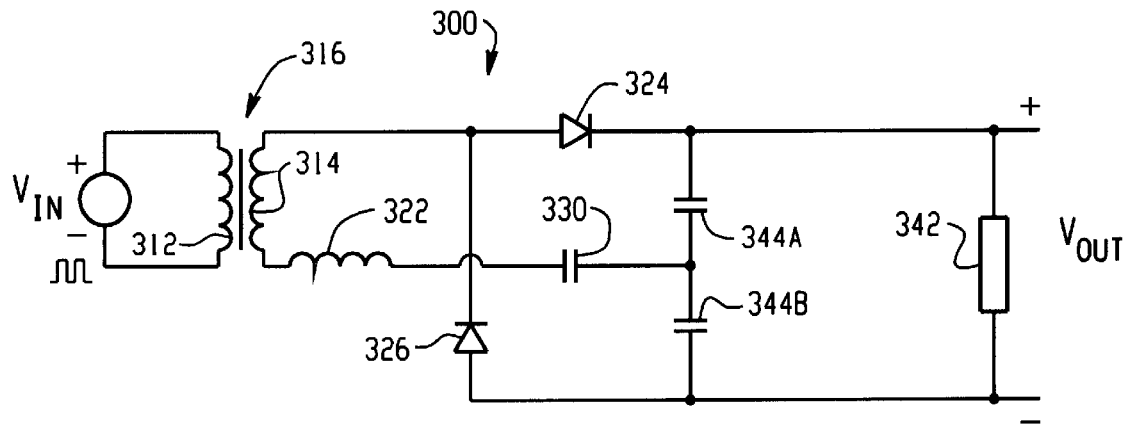
FIG. 4 is a schematic of a resonance energy conversion circuit according to a third embodiment of the present invention.

A converter circuit 300 is shown in FIG. 4 is a third embodiment of the present invention. In this circuit 300, the two resonance capacitors 128 and 130 are replaced by a single, larger resonance capacitor 330, which is nearly equivalent in size to the two corresponding capacitors x28 and x30 previously used in circuits 100 and 200. The filter circuit also includes series capacitors 344A and 344B substituting for the single capacitor 244 in circuit 200, and there is no inductor as was found in the circuit 100.

Figure 5:
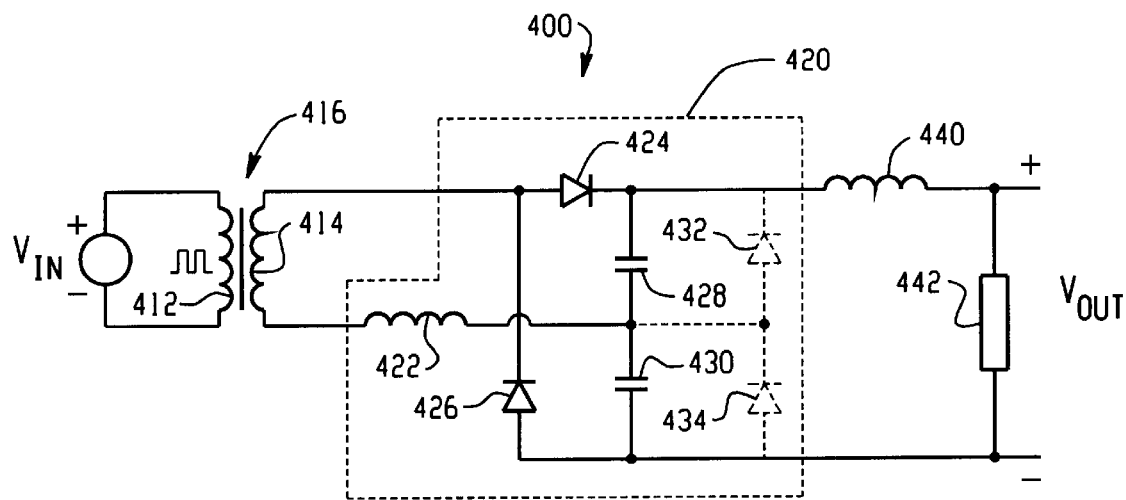
FIG. 5 is a schematic of a resonance energy conversion circuit according to a fourth embodiment of the present invention.

With reference to FIG. 5, a converter circuit 400 according to a fourth embodiment of the present invention is shown. The configuration of this circuit 400 allows for a more dynamic load and/or a larger load since the blocking diodes 432 and 434 (shown in phantom) that normally block the resonance capacitors 428 and 430 in the resonance section 420 are removed. In operation, even with an Vin overload condition, the output voltage remains the same. This is in contrast to the configuration in alternative embodiments where blocking diodes x32 and x34 are in parallel to resonance capacitors x28 and x30. In these alternative embodiments the voltages drop at the outputs if there is a Vin overload. In operation, a frequency of commutation used to drive this circuit 400 is held constant. Also, the primary section of circuit 400 is configured as both a ZCS and ZVS switching circuit. In this configuration, there can be no frequency control or PWM control of the output and there is an optimal condition for switching loss and a small noise value, so the efficiency of the circuit 400 is even higher than the circuits in other alternative embodiments.

Turning to FIG. 6A, a converter circuit 500 according to fifth embodiment of the present invention is shown. This circuit 500 is another alternative Alexander circuit topology as compared to circuit 100–400. In this alternative configuration there is a switching section 502, which includes switches S1 and S2, on the primary side, but having no inductor in the filter section. The switching section 502 further includes diodes 504' and 504" and capacitors 506' and 506", which are connected in parallel with the switches S1 and S2, respectively. In operation, both the frequency of commutation and the duty cycle D of the switching is held constant. FIG. 6B shows the voltage across the switches S1 and S2 during different operating modes over a predetermined period of time.

Figure 7:
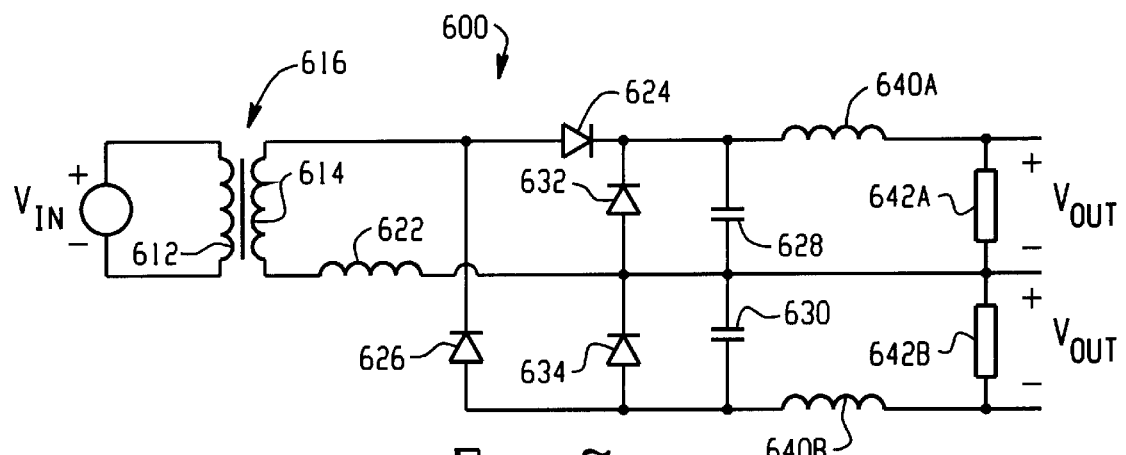
FIG. 7 is a schematic of a resonance energy conversion circuit according to a sixth embodiment of the present invention.

With reference to FIG. 7, a converter circuit 600 according to the sixth embodiment of the present invention is shown. As is clear, this circuit 600 is configured to allow for two load sections, and therefore two output voltages. In this configuration, the two filter sections have inductors 640A and 640B and resistive devices 642A and 642B, respectively.

Figure 8A:
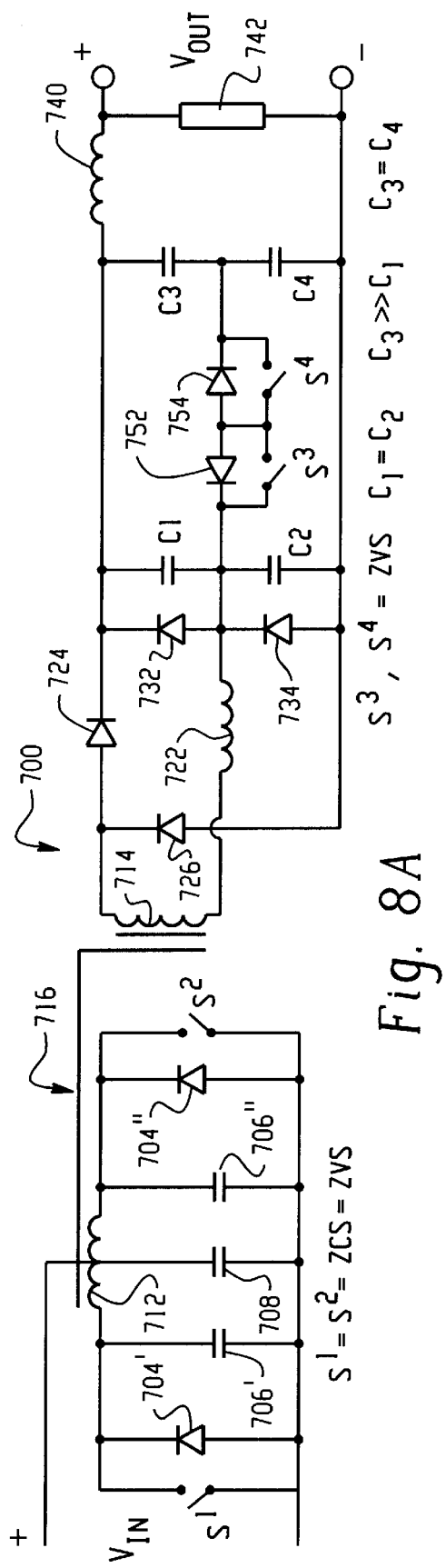
FIG. 8A is a schematic of a resonance energy conversion circuit according to a seventh embodiment of the present invention.

Turning now to FIG. 8A, a converter circuit 700 according to the seventh embodiment of the present invention is shown. The configuration of this circuit 700 is similar to a combination of circuits 10 and 500 shown in FIGS. 1 and 6A, respectively. Circuit 700 operates by having a constant frequency of commutation for switches S1 and S2 on the primary side, which both operate with ZCS and ZVS. The secondary side is controlled through the use of switches S3 and S4 that are driven by PWM. These switches turn off with zero voltage and turn on at zero voltage and zero current. By using the switches S3 and S4, circuit 700 can operatively function, during different switching times, as having either a 1:5 turns ratio, similar to circuit 10 in FIG. 1, or a 1:10 turns ratio, similar to circuit 500 in FIG. 6A. This is done by having the preferred values of: C1=C2, C3>>C1, and C3=C4, by keeping the frequency of commutation constant, and by varying the duty cycle, D, of the switches S3 and S4.

Figure 8B:
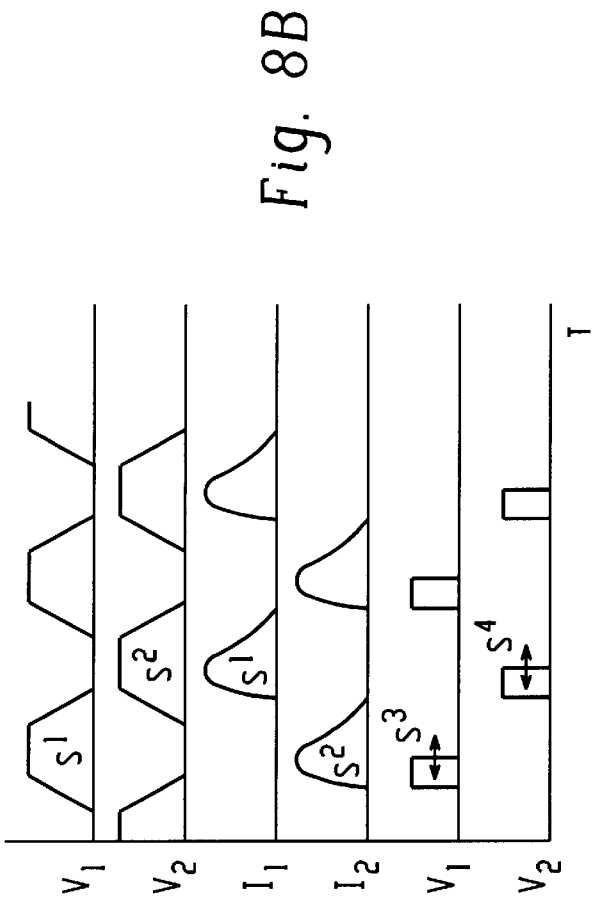
FIG. 8B is a graph showing the voltage across and current through the switches of the circuit in FIG. 8A during different modes over a predetermined time period.
Figure 8C:
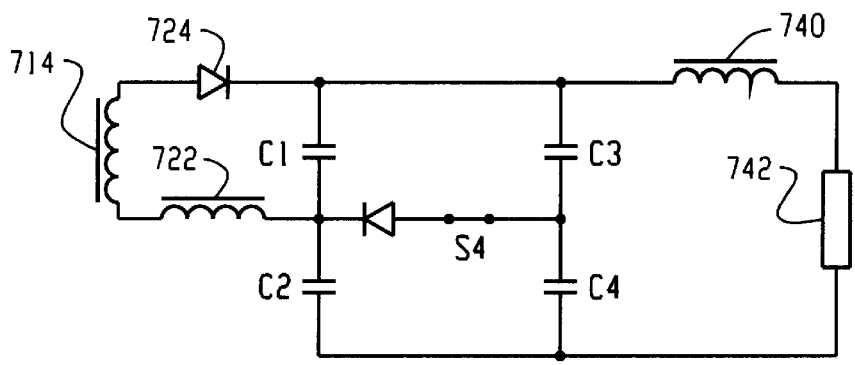
FIGS. 8C–8F are schematic circuits showing the configuration of the circuit in FIG. 8A during different modes over a predetermined time period.
Figure 8D:
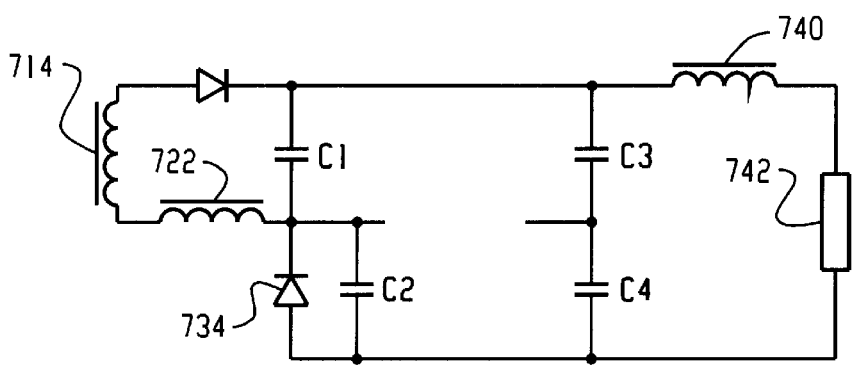
Figure 8E:
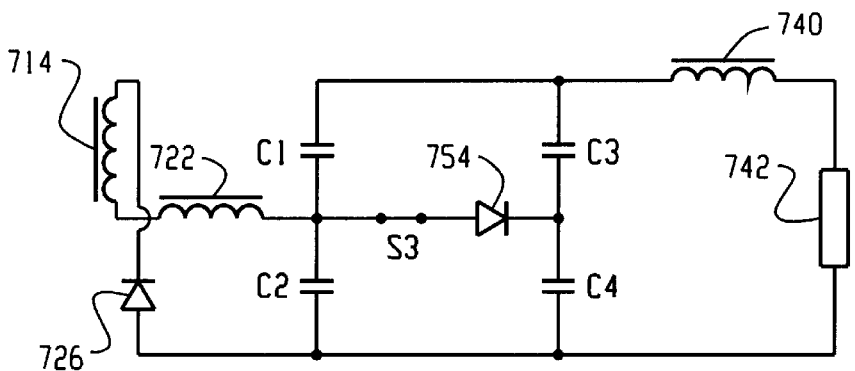
Figure 8F:
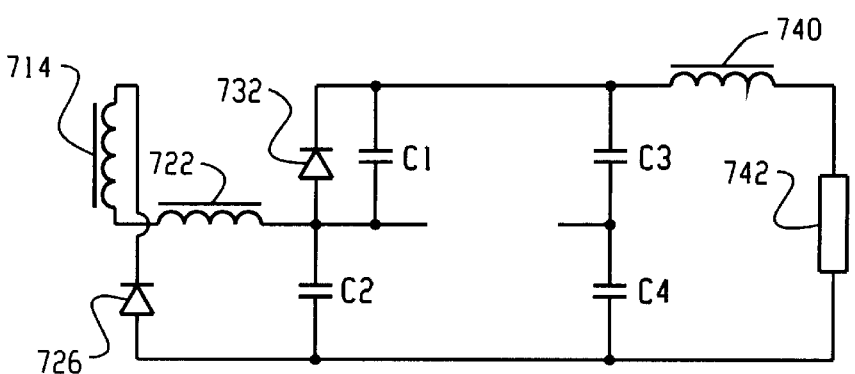

With reference to FIG. 8B, graphs are shown that illustrate the voltage across and current through switches S1 and S2 during different modes of the circuit 700 over a predetermined period of time. This figure also shows graphs that illustrate the voltage across switches S3 and S4 during the different operating modes of circuit 700 over the same predetermined period of time as above. The varying theoretical circuit connections of the circuit 700 during the different modes over the predetermined period of time are shown in FIGS. 8C–F.

Figure 9:
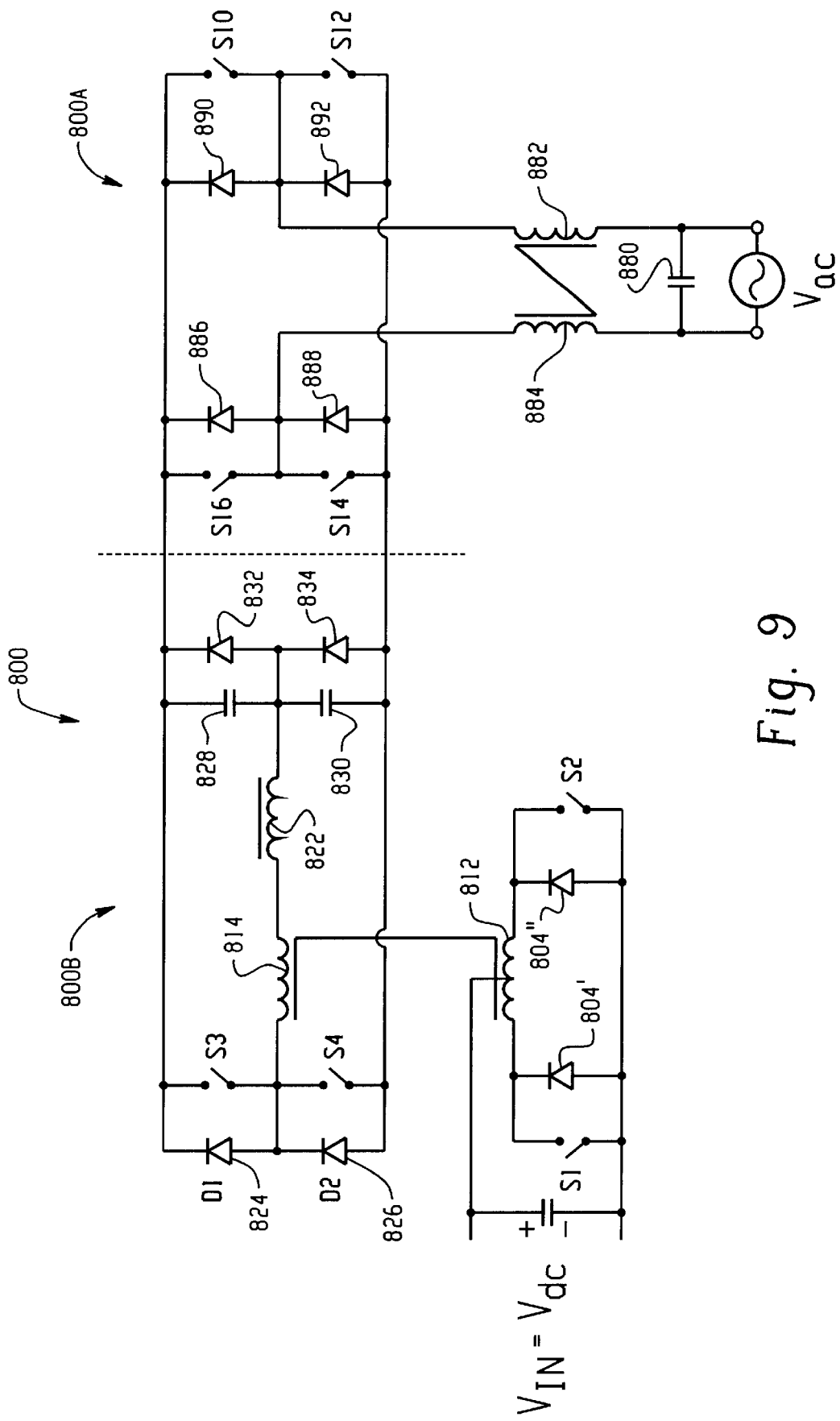
FIG. 9 is a schematic of a resonance energy inversion circuit according to an eighth embodiment of the present invention.

As can be seen in FIG. 9, a resonance energy conversion/inversion circuit 800 according to an eighth embodiment of the present invention is shown. Circuit 800 is comprised of a first circuit section 800A, which is configured to operate as a single-phase full bridge inverter circuit, connected to a second circuit section 800B, which is configured to operate as a multi-voltage resonance circuit. Preferably, circuit 800 functions as a bi-directional inverter, i.e., the unit functions as an inverter (battery-load-DC-AC) or as a charger (AC-DC). By using this embodiment of the Alexander typology, the circuit 800 can also operate as a DC-AC up-step inverter with a weak DC link (where there are no electrolytic capacitors in the DC link).

In this configuration, reactive energy flows directly from and to the battery Vdc. The output voltage is controlled by changing the frequency of commutation, where PWM also controls the output voltage. Reactive energy is returned to the battery during pauses in the process of forward energy conversion. The alternative embodiments of circuits 900 and 1000, shown in FIGS. 10A and 11A, as described in more detail below, operate in a similar manner.

In inverter circuit section 800A, the AC power source, Vac, is connected to a full bridge inverter circuit configuration across a capacitor 880 and through inductors 882 and 884, where the inductors 882 and 884 form a transformer. This inverter circuit section 800A further includes switches S10, S12, S14, and S16 and diodes 886, 888, 890, and 892. The inverter circuit section 800A is connected to the converter circuit section 800B, where the combined circuit 800 is configured to operate in conformance with the functionality of the other embodiment of the present invention, i.e., as the Alexander topology circuit.

In the circuit section 800B, switches S1–S4 are all bi-directional switches, e.g., MOSFETs or IGBTs and the power source Vdc is a battery. In this configuration, the capacitance of capacitors 828 and 830 is reduced in comparison to the alternative embodiments of the present invention, for example the capacitance can be reduced from 10,000 μF to 3 μF. This reduction in capacitance results in a savings of space, since smaller capacitance results in comparably smaller capacitors, and cost of the overall system.

Figure 10A:
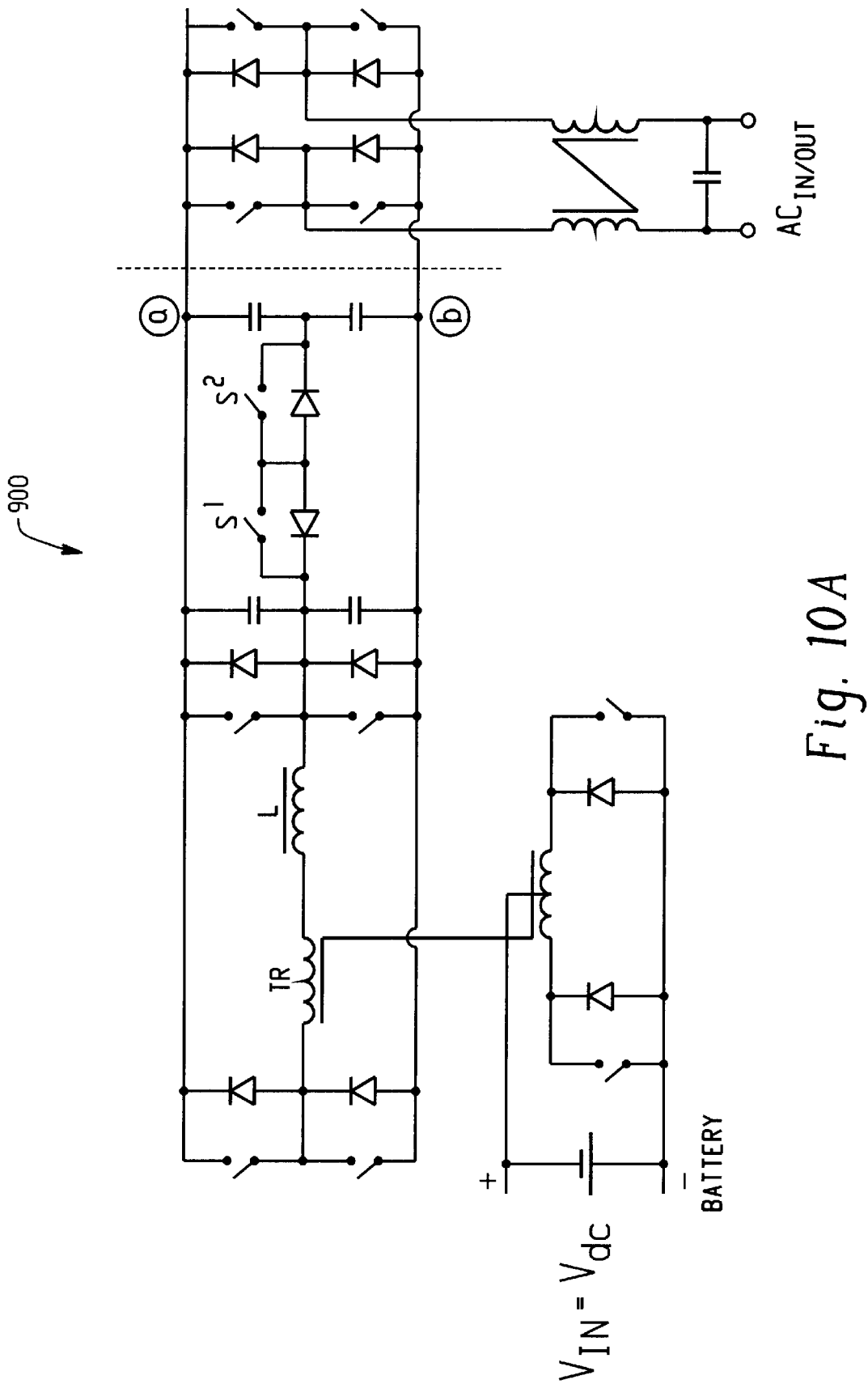
FIG. 10A is a schematic of a resonance energy inversion circuit according to a ninth embodiment of the present invention.
Figure 10B:
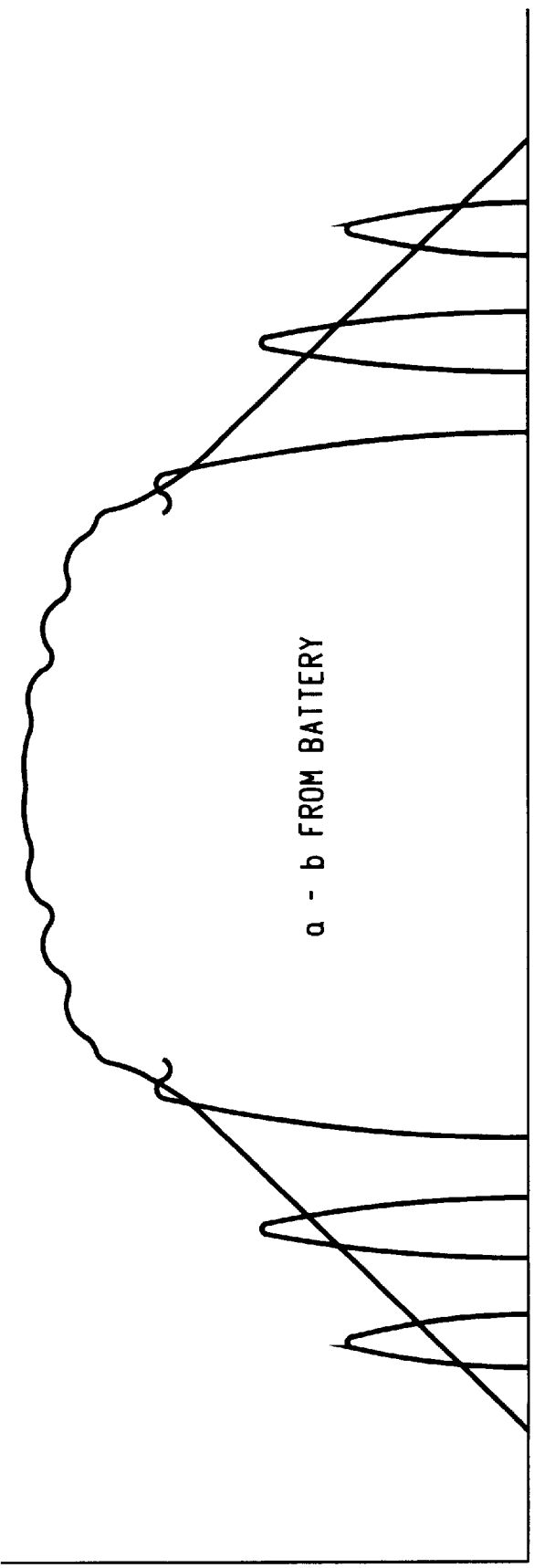
FIG. 10B is a graph showing the waveform at nodes "a" and "b" when operating off the battery in FIG. 10A over a predetermined time period.

In an alternative configuration of the circuit 800 as shown in FIG. 9, FIG. 10A shows a circuit 900, where no elements numbers are shown for ease of discussion, which also incorporates the technology and advantages of circuit 700 of FIG. 8A, in accordance with a ninth embodiment of the present invention. All the switches in circuit 900 are bi-directional, similar to the elements in the circuit 800 of FIG. 9. From the battery Vdc, the frequency of commutation is variable based on 50 Hz or 60 Hz frequency, and S1 and S2 are both PWM. From the AC source, Vac in/out, the frequency is constant and maximum with power factor correction. FIG. 10B illustrates the energy produced at nodes "a" and "b" when power is supplied by the battery.

Now turning to FIG. 11A, an inverting/charging circuit 1000 according to a tenth embodiment of the present invention is shown. In circuit 1000, the switches S1, S2, and S3 are configured as shown in FIG. 11B. Through this configuration, each switch S1, S2, and S3 has independent control of the direction of the circuit 1000.

Figure 12A:
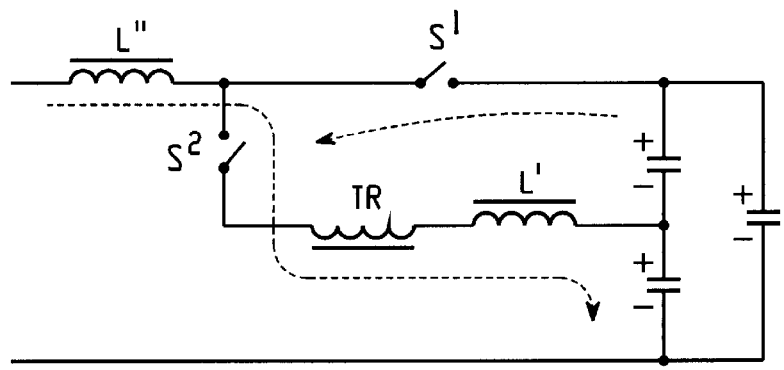
FIGS. 12A–D are schematic diagrams showing the configuration of the circuit of FIG. 11 during different modes over a predetermined time period.
Figure 12B:
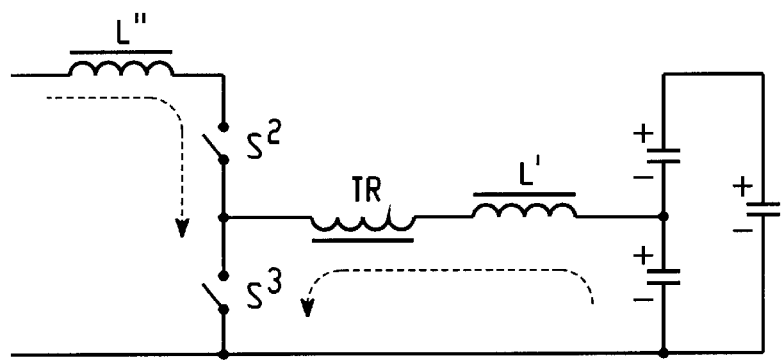
Figure 12C:
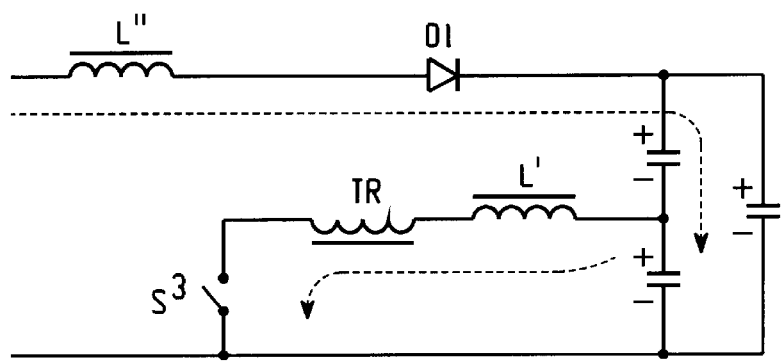
Figure 12D:
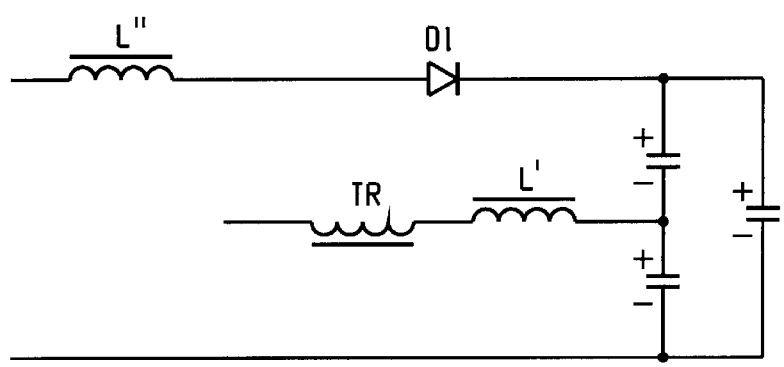
Figure 12E:
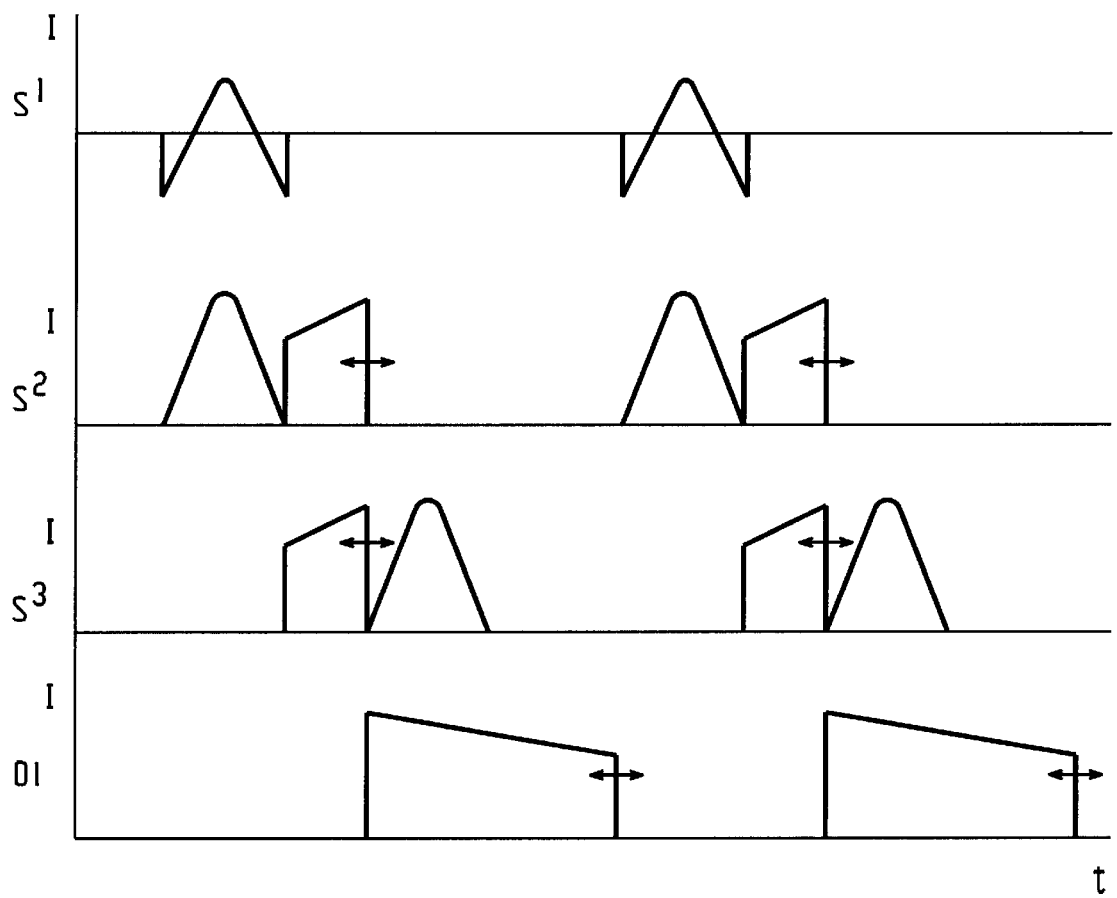
FIG. 12E is graph showing the current from the AC source passing through the switches and D1 in the circuit of FIG. 11 when L is large and theoretically is not operating.

The flow of current produced by Vac in/out in circuit 1000 is shown in FIGS. 12A–12D. The flow of current is in one direction, and shown as time-dependent theoretical configurations of the resonance section of the circuit 1000 when L' is large. Thus, certain elements do not theoretically operate in the resonance section of circuit 1000 during various times in the commutation cycle. FIG. 12E shows a graph of the current passing through the switches S1, S2, and S3 and D1 during the discrete points of time shown in FIGS. 12A–D.

Figure 13A:
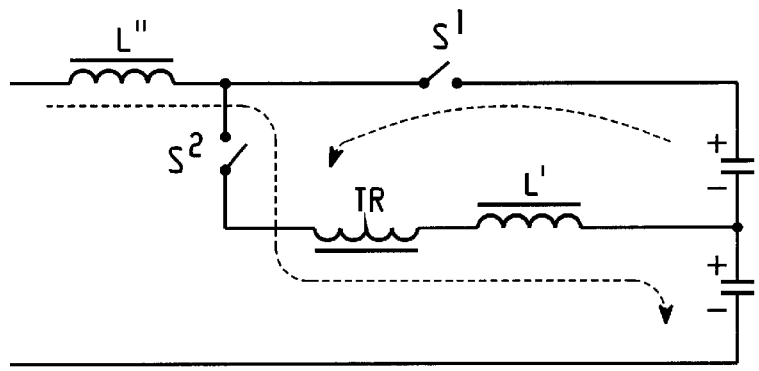
FIGS. 13A–D are schematic diagrams showing the configuration of the circuit of FIG. 11 during different modes over a predetermined time period.
Figure 13B:
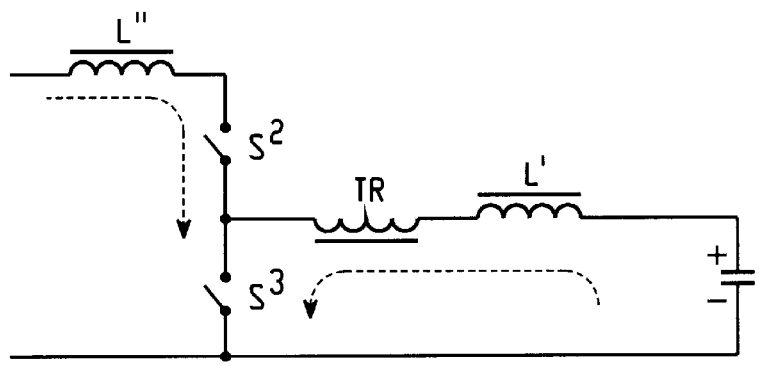
Figure 13C:
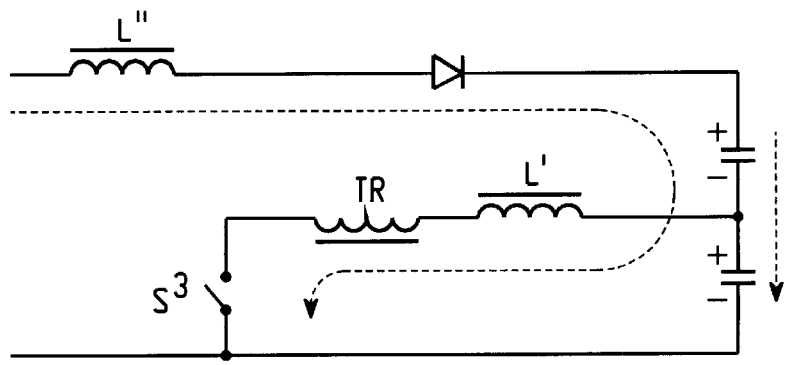
Figure 13D:
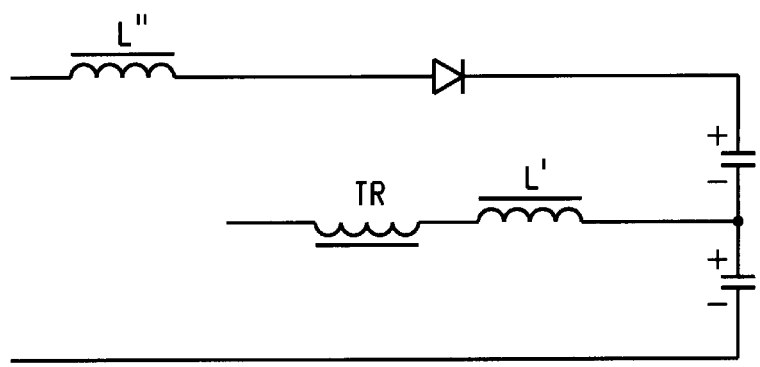
Figure 13E:
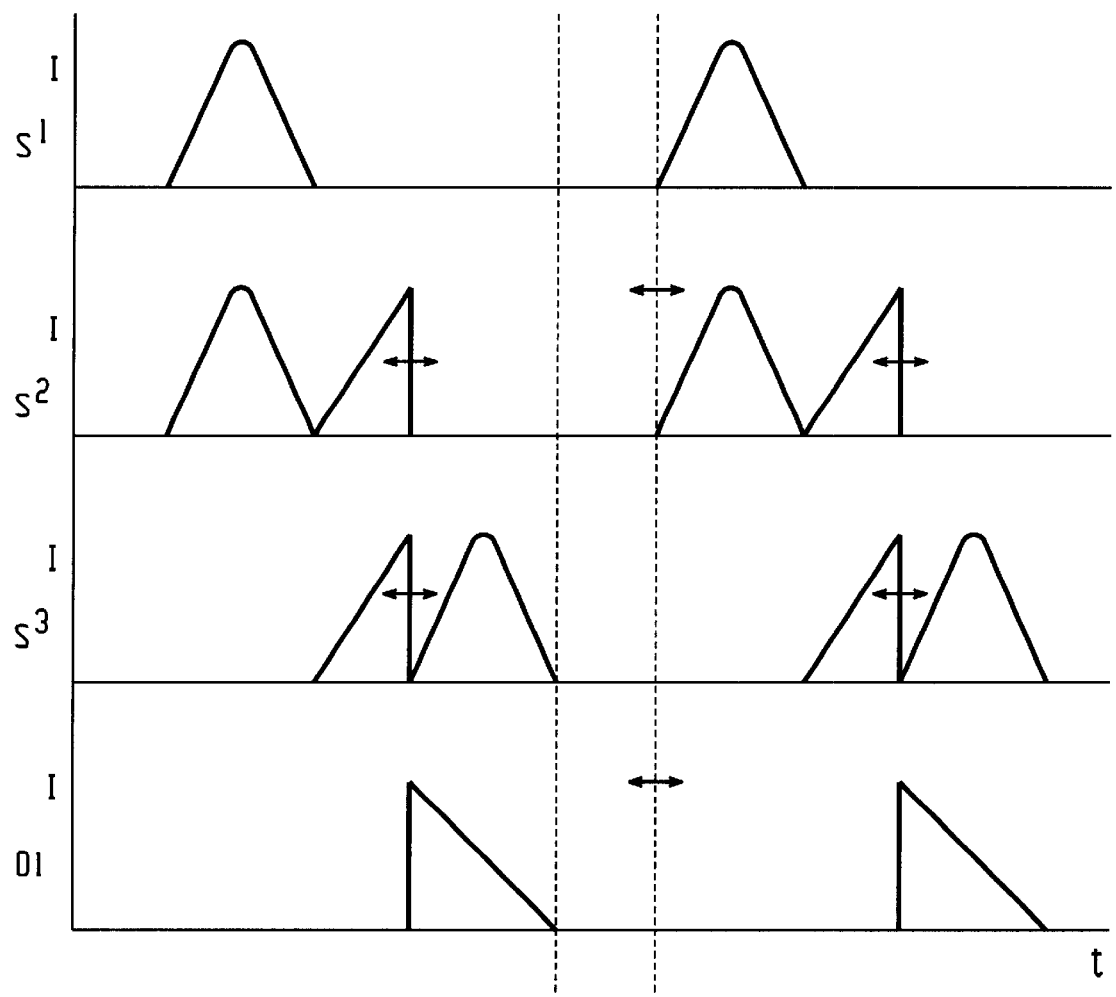
FIG. 13E is a graph showing the current from the AC source passing through the switches and D1 in the circuit of FIG. 11 when L is operating.

The flow of current produced by Vac in/out in circuit 1000 is shown in FIGS. 12A–12D. The flow of current is in one direction, and shown as time-dependent theoretical configurations of the resonance section of the circuit 1000 when L' is small. Thus, certain elements do not theoretically operate in the resonance section of circuit 1000 during various times in the commutation cycle. FIG. 13E shows a graph of the current passing through the switches S1, S2, and S3 and D1 during the discrete points of time shown in FIGS. 13A–D.

Figure 14:
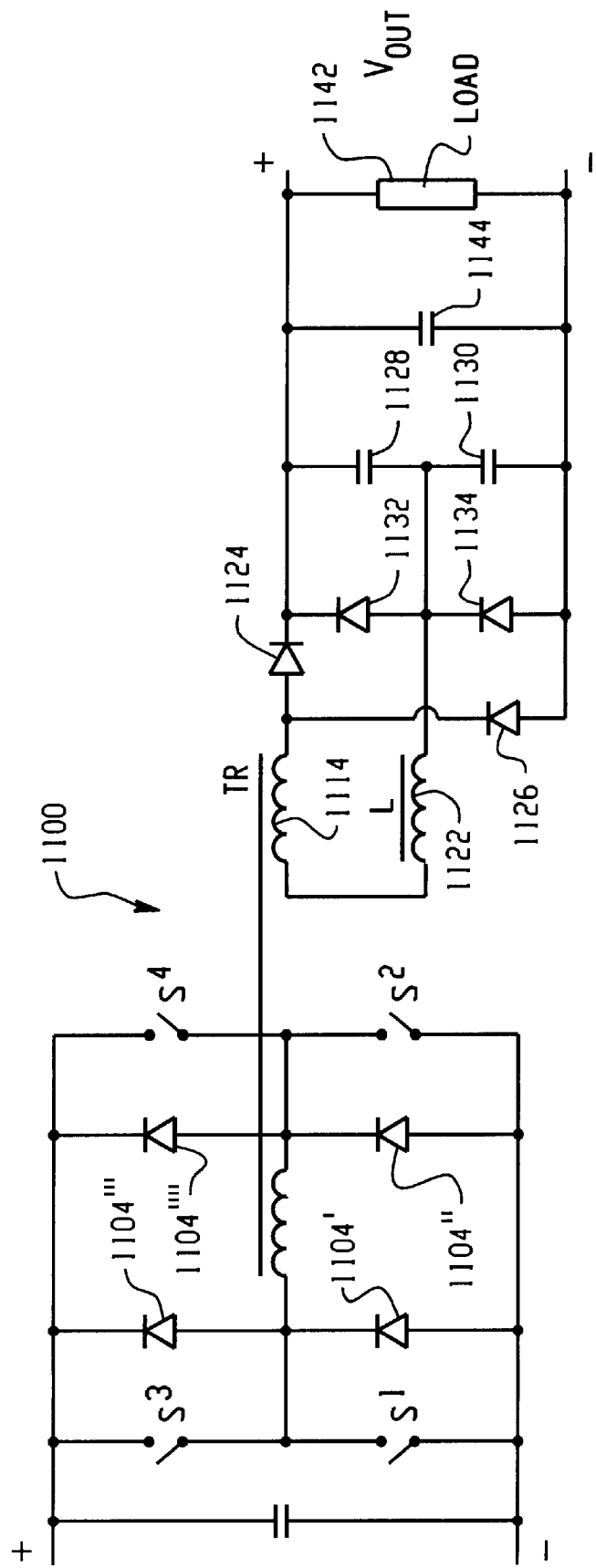
FIG. 14 is a schematic of a resonance energy converter circuit according to an eleventh embodiment of the present invention.

Turning to FIG. 14, a converter circuit 1100 according to an eleventh embodiment of the present invention is shown. This circuit 1100 is configured to operate as a full bridge converter with no inductor in the filter section. In this configuration, circuit 1100 has similar functions and advantages as those described for circuit 200 in FIG. 3.

The table for different parameters resulting from the operation of circuit 1100 is shown in Table 1 below.

TABLE 1

| Vin (Vdc) | Vout (Vdc) | Pw | η (Efficiency) |
|---|---|---|---|
| 10.4 | 341 | 1340 | .90 |
| 10.8 | 368 | 1008 | .93 |
| 13.5 | 457 | 1559 | .93 |
| 13.7 | 466 | 1063 | .94 |

Thus, the results in Table 1 show that the transformer 1114 with a smaller turns ratio compared to a conventional converter (in one embodiment actual N=1:18), and thus smaller inductance and leakage, can result in the same Vout desired, while exhibiting efficiency levels above 90%. This is accomplished through the use of the multi-voltage section, capacitors 1128 and 1130, i.e., the Alexander topology, of the present invention.

From the above description of the invention, those skilled in the art will perceive improvements, changes and modifications in the invention. Such improvements, changes and modifications within the skill of the art are intended to be covered by the appended claims.

We claim:

1. A circuit comprising:

a primary section that receives an input voltage; and a secondary section comprising a series capacitance multiple voltage resonance section and a rectifying section, the series capacitance multiple voltage resonance section connected on an output side of the rectifying section, the secondary section generating an output voltage of a higher magnitude than the input voltage based on the series capacitance.

2. The circuit according to claim 1 wherein the secondary section further comprises:

a filter section; and a load coupling section.

3. The circuit according to claim 2 further comprising a second filter section and a second load coupling section.

4. The circuit according to claim 1 further comprising a transformer that is operatively configured to couple the primary and secondary sections, wherein the capacitive multiple-voltage resonance section comprises series resonance capacitors, whereby the series resonance capacitors operatively generate the output voltage such that a turns ratio of the transformer is lower than a transformer with a non-multiple voltage resonance section to generate the output voltage, whereby energy loss from the transformer is reduced thereby increasing efficiency.

5. The circuit according to claim 1 wherein the primary section is configured to operate as a zero-current switching (ZCS) section.

6. The circuit according to claim 5 wherein the ZCS section has a variable commutation frequency.

7. The circuit according to claim 5 wherein the ZCS section has a constant commutation frequency.

8. The circuit according to claim 1 wherein the primary section is configured to operate as a zero-voltage switching (ZVS) and ZCS section.

9. The circuit according to claim 8 wherein the primary section has a variable commutation frequency.

10. The circuit according to claim 8 wherein the primary section has a constant commutation frequency.

11. The circuit according to claim 1 wherein the circuit is configured to operate as a push-pull circuit.

12. The circuit according to claim 1 wherein the circuit is configured to operate as a step-up circuit.

13. The circuit according to claim 1 wherein the circuit is operatively configured to operate as a bi-directional inverter circuit.

14. The circuit according to claim 1 wherein the circuit is operatively configured to operate as a forward converter circuit.

15. The circuit according to claim 1 wherein the circuit is operatively configured to operate as a one-directional inverter circuit.

16. The circuit according to claim 1 wherein the circuit is operatively configured to operate as an inverter circuit.

17. The circuit according to claim 1 wherein the circuit is operatively configured to operate as a fill-bridge forward circuit.

18. A method comprising the steps of:

receiving an input voltage value in a primary section;

transforming the input voltage value to produce a transformed voltage value that is input into a secondary section;

rectifying the input voltage value in the secondary section;

generating a multiple voltage value that is stepped-up from the input voltage value in a series capacitive multiple voltage resonance section in the secondary section, where the series capacitive multiple voltage resonance section is connected to an output side of the rectifying section; and outputting the stepped-up multiple voltage value to a load section that is connected across the series capacitive multiple voltage resonance section;

whereby the series capacitance operatively generates the stepped-up voltage such that a turns ratio of a transformer that is comprise of the primary section and the secondary section is lower than a transformer with a non-voltage resonance section utilized to generate the output voltage, whereby energy loss from the transformer is reduced thereby increasing efficiency.

19. A forward converter circuit comprising:

a primary section that receives an input voltage; and a secondary section including a secondary winding, an inductor having a first side connected to a first side of the secondary winding, a first diode connected for conducting current between a second side of the secondary winding and a first side of a first capacitor, a second capacitor having a first side connected to a second side of the first capacitor, a second diode connected for conducting current between a second side of the second capacitor and the second side of the secondary winding, the inductor having a second side connected to both the second side of the first capacitor and the first side of the second capacitor, the secondary section generating an output voltage of a higher magnitude than the input voltage based on a series capacitance multiple voltage resonance section formed by the first capacitor and the second capacitor.

20. The circuit of claim 19 wherein the secondary section further includes a third diode connected in parallel with the first capacitor and a fourth diode connected in parallel with the second capacitor, the third and fourth diodes connected in series, and the second side of the inductor further connected between the third and fourth diodes.

* * * * *